United States Patent
Rasheed et al.

(10) Patent No.: US 10,110,856 B2
(45) Date of Patent: Oct. 23, 2018

(54) SYSTEMS AND METHODS FOR VIDEO ANALYSIS RULES BASED ON MAP DATA

(71) Applicant: AVIGILON FORTRESS CORPORATION, Vancouver (CA)

(72) Inventors: Zeeshan Rasheed, Herndon, VA (US);
Dana Eubanks, Herndon, VA (US);
Weihong Yin, Great Falls, VA (US);
Zhong Zhang, Great Falls, VA (US);
Kyle Glowacki, Reston, VA (US);
Allison Beach, Leesburg, VA (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 179 days.

(21) Appl. No.: 14/959,919

(22) Filed: Dec. 4, 2015

(65) Prior Publication Data
US 2016/0165193 A1 Jun. 9, 2016

Related U.S. Application Data

(60) Provisional application No. 62/088,316, filed on Dec. 5, 2014, provisional application No. 62/088,443, filed
(Continued)

(51) Int. Cl.
*H04N 7/18* (2006.01)
*G06T 17/05* (2011.01)
(Continued)

(52) U.S. Cl.
CPC ......... *H04N 7/181* (2013.01); *G06K 9/00771* (2013.01); *G06K 9/3241* (2013.01);
(Continued)

(58) Field of Classification Search
CPC .............................. H04N 7/181; G06T 17/05
See application file for complete search history.

(56) References Cited

U.S. PATENT DOCUMENTS 6,359,647 B1 3/2002 Sengupta et al.
6,696,945 B1 2/2004 Venetianer et al.
(Continued)

OTHER PUBLICATIONS

Non-Final Office Action dated Jul. 14, 2017, U.S. Appl. No. 14/959,571, pp. 1-28.
(Continued)

*Primary Examiner* — Obafemi Sosanya
(74) *Attorney, Agent, or Firm* — MH2 Technology Law Group, LLP

(57) ABSTRACT

Systems, methods and computer-readable media for creating and using video analysis rules that are based on map data are disclosed. A sensor(s), such as a video camera, can track and monitor a geographic location, such as a road, pipeline, or other location or installation. A video analytics engine can receive video streams from the sensor, and identify a location of the imaged view in a geo-registered map space, such as a latitude-longitude defined map space. A user can operate a graphical user interface to draw, enter, select, and/or otherwise input on a map a set of rules for detection of events in the monitored scene, such as tripwires and areas of interest. When tripwires, areas of interest, and/or other features are approached or crossed, the engine can perform responsive actions, such as generating an alert and sending it to a user.

20 Claims, 7 Drawing Sheets

Related U.S. Application Data on Dec. 5, 2014, provisional application No. 62/088,446, filed on Dec. 5, 2014, provisional application No. 62/109,841, filed on Jan. 30, 2015, provisional application No. 62/088,394, filed on Dec. 5, 2014.

(51) Int. Cl.
*G06K 9/00* (2006.01)
*G06K 9/32* (2006.01)
*G06K 9/62* (2006.01)
*G08B 13/196* (2006.01)

(52) U.S. Cl.
CPC ............ *G06K 9/6255* (2013.01); *G06T 17/05* (2013.01); *G08B 13/19671* (2013.01); *H04N 7/188* (2013.01); *G06T 2207/30232* (2013.01); *G06T 2219/2004* (2013.01)

(56) References Cited

U.S. PATENT DOCUMENTS

| | | | |
|---|---|---|---|
| 6,970,083 | B2 | 11/2005 | Venetianer et al. |
| 6,999,600 | B2 | 2/2006 | Venetianer et al. |
| 7,319,479 | B1 | 1/2008 | Crabtree et al. |
| 7,391,907 | B1 | 6/2008 | Venetianer et al. |
| 7,424,175 | B2 | 9/2008 | Lipton et al. |
| 7,801,330 | B2 | 9/2010 | Zhang et al. |
| 7,825,954 | B2 | 11/2010 | Zhang et al. |
| 7,868,912 | B2 | 1/2011 | Venetianer et al. |
| 8,150,103 | B2 | 4/2012 | Zhang et al. |
| 8,334,906 | B2 | 12/2012 | Lipton et al. |
| 8,711,217 | B2 | 4/2014 | Venetianer et al. |
| 8,823,804 | B2 | 9/2014 | Haering et al. |
| 8,948,458 | B2 | 2/2015 | Hassan-Shafique et al. |
| 9,165,190 | B2 | 10/2015 | Zhang et al. |
| 2003/0095687 | A1 | 5/2003 | Montgomery |
| 2007/0039030 | A1 | 2/2007 | Romanowich et al. |
| 2007/0070190 | A1* | 3/2007 | Yin ................ G08B 13/19626 348/36 |
| 2007/0182818 | A1 | 8/2007 | Buehler |
| 2008/0198231 | A1 | 8/2008 | Ozdemir et al. |
| 2010/0026802 | A1* | 2/2010 | Titus ................ G08B 13/19608 348/143 |
| 2010/0106420 | A1* | 4/2010 | Mattikalli ............... G06T 17/05 702/2 |
| 2010/0157064 | A1 | 6/2010 | Cheng et al. |
| 2010/0321473 | A1 | 12/2010 | An |
| 2011/0115909 | A1 | 5/2011 | Sternberg et al. |
| 2011/0205355 | A1 | 8/2011 | Liu et al. |
| 2012/0169882 | A1 | 7/2012 | Millar et al. |
| 2012/0212611 | A1 | 8/2012 | Estes et al. |
| 2013/0329958 | A1 | 12/2013 | Oami et al. |
| 2014/0211019 | A1 | 7/2014 | Choi |
| 2015/0088982 | A1 | 3/2015 | Johnson et al. |
| 2016/0165187 | A1 | 6/2016 | Rasheed et al. |
| 2016/0165191 | A1 | 6/2016 | Rasheed et al. |

OTHER PUBLICATIONS

Chao-Yang Lee et al., "Adaptive Camera Assignment and Hand-Off Algorithm in Multiple Active Camera Surveillance System", Proceedings of the Ninth International Conference on Machine Learning and Cybernetics, Jul. 2010, pp. 1-6.

Yiming Li et al., "Fusion of Multiple Trackers in Video Networks", Proceedings of the Fifth ACM/IEEE International Conference on Distributed Smart Cameras, Aug. 2011, pp. 1-6.

PTO Non-Final Office Action dated Nov. 30, 2017, U.S. Appl. No. 14/959,831, pp. 1-40.

* cited by examiner

SYSTEMS AND METHODS FOR VIDEO ANALYSIS RULES BASED ON MAP DATA

CROSS REFERENCE TO RELATED APPLICATIONS

This application claims priority to and the benefit of U.S. Provisional Patent Application No. 62/088,316, titled "USING DIGITAL ELEVATION MODEL DATA TO IDENTIFY AND CLASSIFY TARGETS," filed on 5 Dec. 2014, and U.S. Provisional Patent Application No. 62/088,443, titled "AUTOMATIC RULE CREATION," filed on 5 Dec. 2014, and U.S. Provisional Patent Application No. 62/088,446, titled "RULES BASED ON MAP DATA," filed on 5 Dec. 2014, and U.S. Provisional Patent Application No. 62/088,394, titled "TIME-OF-APPROACH RULE," filed on 5 Dec. 2014, and U.S. Provisional Patent Application No. 62/109,841, titled "DEM DATA BOUNDARY HANDLING," filed on 30 Jan. 2015, the contents of all of which are hereby incorporated herein by reference in their entirety. This application is related to U.S. patent application Ser. No. 14/959,831, entitled "Systems and Methods for Automated Visual Surveillance" filed on Dec. 4, 2015 (the same day as the present application), and U.S. patent application Ser. No. 14/959,571, entitled "TIME-OF-APPROACH RULE" filed on Dec. 4, 2015 (the same day as the present application), the contents of both of which are hereby incorporated herein by reference in their entirety.

STATEMENT RE: FEDERALLY SPONSORED RESEARCH OR DEVELOPMENT

This invention was made with government support under Contract No. M67854-12-C-6548 awarded by the Office of Naval Research. The government has or may have certain rights in the invention.

TECHNICAL FIELD

The current disclosure relates to analyzing video data, and in particular, to creating and utilizing video analysis rules based on map data, which rules may be used for anomalous activity detection.

BACKGROUND

Known video analytics systems generally consist of a set of video sensors and/or other sensors arranged to monitor an area of interest. That area can be or include, merely for instance, power stations, airports, military bases, pipelines, or other areas of installations. In generally, known video analytics systems process and analyze pixels and apply some form of detection logic to identify events of concern in the area of interest.

In terms of the detection logic used to monitor the desired area, traditional video analytics systems require users to define "tripwires" or other features on the visual, pixel-based image generated by each sensor to establish the boundary, perimeter, or area to be protected. In known systems, the tripwire or other features are manually drawn or placed directly on the pixels of the view generated by each sensor, e.g., on a touchscreen display showing the view from or recorded by a surveillance camera. The user may then be prompted to save or further specify detection rules that specify the tripwires or other features in pixel space.

This pixel-based technique for defining tripwires and other features may be undesirable in various situations, such as for defining tripwires in installations that use multiple sensors for surveillance of the same physical area. In such installations, the user must inefficiently define the same tripwire or other features multiple times. That is, the user must access the video stream generated by each individual sensor, manually enter the tripwire or other features, and then repeat that process for each of the multiple sensors. Another shortcoming of such traditional systems is that the various user-drawn tripwires or other features may not exactly coincide with each other, due to human error in placing them in each sensor's view, or due to other factors. Yet another drawback is that it is technically very difficult to develop systems that automatically transfer a pixel-defined tripwire from one camera or monitor to another camera or monitor, because the pixels of one camera or monitor do not have a common frame of reference with any other camera or monitor.

Accordingly, it may be desirable to develop systems, methods, and products that address these and other shortcomings of traditional video analytics solutions.

SUMMARY

According to aspects of the disclosed embodiments, methods, systems, and computer-readable media for generating video analysis rules from a map are disclosed.

Disclosed herein are systems, methods, and computer readable media for generating video analysis rules. The disclosed systems, methods, and media may perform various functions and operations, such as displaying, for example on a map-based user interface, a map of the geographic area that is covered by the sensor; accepting, for example via the map-based user interface, a rule-representing feature that is placed in a specific location on the map by a user; generating a video analysis rule based on the rule-representing feature and the specific location on the map, wherein the video analysis rule is expressed in a geo-registered map space; and applying the video analysis rule to the video from the sensor to detect a triggering event in the video. Various implementations may take an action, or cause some device or person to take in response to detecting a triggering event. For example, various implementations may generate a notification upon detection of the triggering event and transmit the notification to a connected device.

In some variations, the notification may causes the connected device to perform an action such as emitting a sound; displaying a view of the geographic area that is covered by the sensor; and providing a user-selectable link that activates transfer of information regarding the triggering event from another device.

In some variations, the rule-representing feature may be a tripwire or an area of interest. In various implementations, the geo-registered map space may be defined in coordinates that are latitude and longitude coordinates.

In some variations, the video provided by the sensor may be pixel-space video, and the functions and operations may include transforming the pixel-space video into video in the geo-registered map space. In such variations, the transforming operation may include associating an element from a frame of the video with coordinates in the geo-registered map space, and the coordinates in the geo-registered map space may be latitude and longitude coordinates.

In still further variations, the video analysis rule may be expressed in coordinates in the geo-registered map space; and applying the video analysis rule to the video from the sensor may include comparing the coordinates of the element from the frame of the video with the coordinates of the video analysis rule to detect the triggering event.

In yet other variations, the system may include a memory containing instructions; an interface to a sensor that provides video of at least a portion of a geographic area; a map-based user interface; and a processor, operably connected to the memory, the interface to the sensor, and the map-based user interface, the executes the instructions to perform the functions and operations described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted. In the drawings.

DETAILED DESCRIPTION OF ILLUSTRATIVE EMBODIMENTS

Various embodiments consistent with the invention allow a user to designate, draw, input, or otherwise define or identify a video analysis feature (e.g., a tripwire, area of interest (AOI), or the like) and associated rule, in terms of geo-registered map data. That is, the user in embodiments herein is permitted to enter or draw tripwires or other features directly on a map, satellite photo, or other overhead-type visual depiction of a monitored area, independent of the video outputs generated by the cameras or other sensors that observe the area. This is technologically very different from traditional video analytics systems, which define video analysis rules in terms of specified pixel data in the individual visual image generated by a particular camera or other sensor. This disclosure's introduction of a generalized, geo-registered map view for control operations permits the user to define or designate, for example, a tripwire or other feature using a line or shape drawn on a map interface that is independent of the pixel images produced by the covering sensors. Moreover, the user may easily and efficiently define tripwires or other rule-defining features by drawing on a named street or other positively identified feature that is labelled on a single map, without resorting to manually attempting to mark those features without identification certainty on individual camera feeds that cover the area shown on the map.

Various embodiments consistent with the invention represent, process, and store video analysis rules in a geo-registered map space or map domain and also analyze video images, including video images from multiple video sources (e.g., cameras or other sensors), in the same geo-registered space. Such embodiments perform rules-related processing in a common or reference geo-coordinate system, rather than in an individual pixel grid that is particular to each individual sensor. This enables site-wide situational awareness, rule sharing, and scene understanding for all monitored areas, because observations from multiple video sources are all represented, translated or otherwise transformed onto the same coordinate system. That is, both the video streams and video analysis rules used for detection logic are transformed into and applied to the same geo-registered map space used by all rules and sensors in the system.

Figure 1:
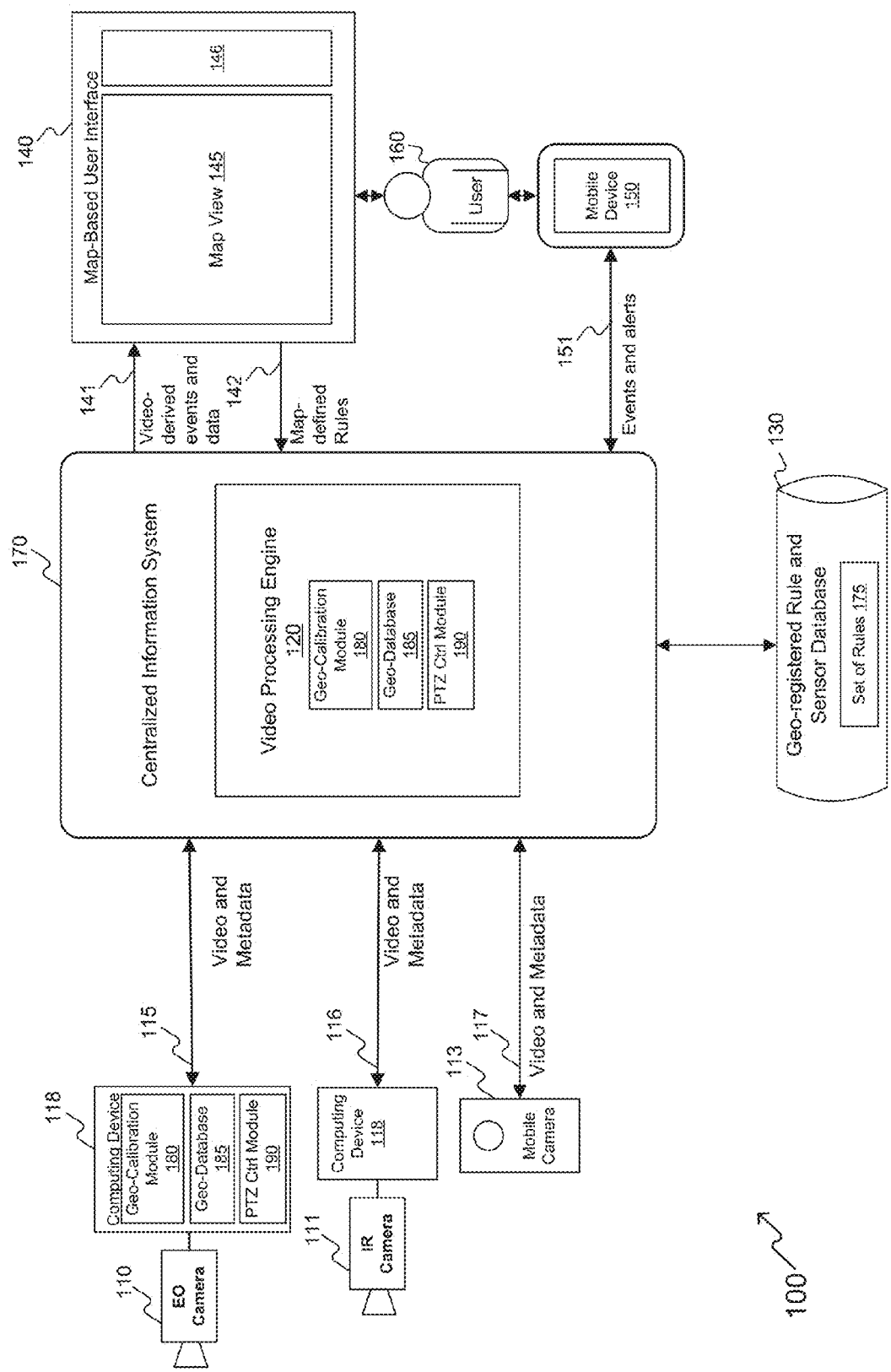
FIG. 1 is a block diagram illustrating an example of a system for creating and using video analysis rules that are based on map data, consistent with an embodiment of the invention.

FIG. 1 is a block diagram illustrating an example of a system 100 for creating and using video analysis rules that are based on map data, consistent with an embodiment of the invention. In the embodiment shown, the system 100 includes a Centralized Information System (CIS) 170, which may be implemented by a computer (e.g. a server) that provides various functionality and operations, which may include communicating with and controlling various pieces of connected hardware and subsystems. In various embodiments, the CIS 170 may implement a video processing engine 120, whose functionality can include a variety of operations on different data, including obtaining or receiving video data and metadata 115-117 from a group of sensors 110-113, transforming or representing the video data 115-117 in geo-registered map space, processing the received, transformed video data 115-117 to determine whether it triggers or matches any video analysis rules, displaying or otherwise presenting the video data 115-117 on a map-based user interface 140, a map interface on a mobile device 150, or the like, and communicating with/controlling the sensors 110-113, the mobile device 150, and other connected devices. In various embodiments, the video processing engine 120 may be implemented by one or more physical computers programmed with appropriate software or firmware code, by one or more virtual computers, by hardwired circuitry, and/or other platforms or systems which make up a CIS 170.

In the example shown, the group of sensors 110-113 can include a set of sensors illustratively including an electro-optical (EO) camera 110, a thermal camera 111, and a mobile camera 113 such as an aerial video camera mounted on a flying vehicle, such as a remotely piloted vehicle, other unmanned aerial vehicle (UAV), a manned aircraft, a satellite, and/or other vehicle or transportation machine. While a set of three sensors are illustratively shown, it will be appreciated that other numbers and/or types of sensors can be used. As shown, some of the sensors 110, 111 may be connected to or a part of a computing device 118. The computing device may create and transmit the metadata that describes the sensor 110, 111 and/or the video, etc. The group of sensors 110-113 (and/or their computing device 118) may respectively stream video and metadata 115-117 to the video processing engine 120 via various connections, channels, or means, such as via a direct hardwired connection or via a wired or wireless network (not shown). Such a network may comprise any suitable technology and may be provided by one or more individual networks, including, for example, wired local area networks (LANs), wireless local area networks (WLAN), and cellular networks, as well as wide area networks (WAN), optical links or connections, and/or other networks or channels.

In various embodiments, a user 160 can interact with the map-based user interface 140 that executes on a desktop, mobile, or other computer or control device or client device, and the map-based user interface 140 may be in communication with the CIS 170 and the video processing engine 120 via various connections, channels, or means, such as via a direct hardwired connection or via a wired or wireless network (not shown). The user 160 may view the imagery of a monitored site, interact with a map of the monitored site on the map view 145 using the controls from the control area 146 of the interface, and perform video detection operations, including using the map view 145 to define, set or otherwise configure a set of one or more map-based rules 175 used to identify, detect, classify, and/or otherwise process events of interest shown in the video streams generated by the group of sensors 110-113, which photograph, video monitor, or otherwise cover the mapped site. In various embodiments, the map-based user interface 140 may receive various types of data 141 transmitted from the video processing engine 120, including video derived events and alerts and data, among other things, which may be displayed in the map view 145. In addition, the map-based user interface 140 may send various types of data 142 to the video processing engine 120, including video analysis rules specifying tripwires, AOIs, approach warning rules, and the like that are defined by the user 160 using the map view 145 and are expressed in terms of geo-registered map space coordinates, among other things.

In general, the sites, scenes, or areas monitored by the system 100 can be high-value, sensitive, or other installations of interest such as airports, train stations, power plants, pipelines, military bases, refineries, highways, and/or other buildings, installations, roads, or sites. This typically includes geographically large areas that cannot be covered by a single camera or sensor and which are therefore covered by multiple fixed cameras and/or which may be covered by mobile cameras mounted on vehicles, including for example aerial vehicles. For such areas, the system 100 advantageously allows a user to specify system-wide map-based rules, which apply to all available sensors 110-113, using a single interface because the rule processing is done in the geo-registered map space or domain instead of in the different pixel domains associated with each individual sensor.

According to embodiments, in general the detection logic encoded in the set of rules 175 can permit the system 100 to detect or identify anomalous events or conditions that are observed by the sensors 110-113, and generate alerts or notifications transmitted to devices associated with human users, for example by digital communication with the map-based user interface 140 or by a text or other event notification 151 to a mobile device 150, such as a cellular telephone, portable computer, tablet, and/or other like device.

In some embodiments, the mobile device 150 may execute a mobile event manager application, which receives data in an event notification 151 representing alerts, notifications, and information from the video processing engine 120. The mobile event manager application enables real-time response to a detected threat by the user of the mobile device 150. For example, the users of a group of mobile devices 150 may each execute the mobile event manager application, which periodically logs each user's location (e.g., the location of the mobile device 150 from the device's GPS) in the geo-registered database 130, and when a perimeter violation occurs (i.e., an anomalous event such as a car crossing a tripwire location), the video processing engine 120 may transmit the event video clip and map location of the violation directly with the nearest user(s). This nearest user may then travel to the site of the violation and investigate. In various embodiments, the event notification 151 may include a user-selectable link that a mobile device user may activate to connect to the system 100 and receive detailed information regarding the event.

In various embodiments, the system 100 may include a geo-calibration module 180 and a geo-database 185 to geolocate a sensor 110-113 and/or the video/image data and metadata 115-117 from the group of sensors 110-113. In some embodiments, the geo-calibration module 180 and a geo-database 185 may be incorporated into the computing device 118 that is dedicated to a sensor 110. In general the video and/or image data contained in the video/image data 115-117 can be encoded or represented in a pixel-based format, such as a pixel-based format which identifies or labels the color, intensity, and other characteristics of a pixel at a location (x,y) in the sensor's output grid. In various implementations the metadata of the video and metadata 115-117 may include data describing the location of the camera (e.g., in latitude and longitude), the orientation of the camera (e.g., azimuth and angle from the horizon), and the field of view of the camera.

By themselves, that raw video and/or image data and the metadata does not reveal or identify the location of that pixel in a geo-registered map space, such as the geographical latitude and longitude of the location shown by the imaged pixel. According to embodiments, the video processing engine 120, geo-calibration module 180, and/or associated (e.g., controlled) logic (e.g., software, firmware, and/or hardware) transforms the video/image data and metadata 115-117 to include or identify the location of each pixel and/or portions of an image, in terms of latitude, longitude, and/or other fixed, absolute, relative, and/or other unified or standard location reference coordinates, which make up the geo-registered map space used throughout the system 100.

That is, the video processing engine 120, geo-calibration module 180, and/or associated logic can translate, transform, extend, and/or otherwise convert the raw video and metadata 115-117 so that the geo-registered location of a given pixel or other image portion can be understood and processed by the items in the geo-registered rule and sensor database 130, such as the map-based video analysis rules.

In some embodiments, while the raw video and/or image data generated by the group of sensors 110-113 may be encoded in a pixel-based format, one or more of the group of sensors 110-113 may also generate or incorporate location metadata associated with the sensor. For example, the geo-calibration module 185 may use location metadata, such as Global Positioning System (GPS) data stored in the sensor or otherwise associated with it, to geo-register the fixed location of the EO camera 110 and the thermal camera 111, and the current location of the mobile (e.g., UAV mounted) camera 113. In some embodiments, geo-registration allows display of the image sensors 110-113 themselves on the map-based user interface 140. For example, the metadata associated with each image sensor 110-113 may provide location data that allows display of both an icon indicating the sensor's location on the map view 145 and lines or a polygon indicating its predicted FOV on the map view 145 of the map-based user interface 140.

In embodiments, geo-calibration of an image sensor 110-113 and/or certain locations in its FOV may also or instead be realized in the field. For example, the location of 3-6 points on the terrain within the FOV of an image sensor, e.g. EO camera 110, may be captured in the field (e.g., using a handheld GPS device) by a technician or installer standing on the FOV terrain when the EO camera 110 is installed, and/or at other times. Those locations can be associated with the particular sensor in the group of sensors 110-113 in the geo-registered rule and sensor database 130, to record the geo position for that location in the image from that sensor (e.g., 110), which may be used to calculate the geo position of other locations in the area of coverage from that sensor. In some embodiments, the map-based user interface 140 can display a field of view (FOV) for an image sensor 110 on a map view 145 based at least on the locations of field-registered points, (e.g., the 3-6 points mentioned above) that are known as being within the FOV of that sensor 110. Either or both location metadata 115-117 and field-registered FOV points may provide the geo-calibration module 180 of the video processing engine 120 with the information required to accurately geolocate an image sensor 110-113 and the terrain within its view. These locations may then be stored in the geo-registered rule and sensor database 130, and/or other data storage.

In the embodiment shown in FIG. 1, the automated monitoring system 100 centralizes all the infrastructure and image sensor locations into one geo-registered rule and sensor database 130. In addition, the automated monitoring system 100 may control one or more of the individual image sensors in the group of sensors 110-113. For example, the video processing engine 120 may include a pan/tilt/zoom (PTZ) control module 190. The PTZ control module 190 may establish a pre-set or other collection of sensor operations, such as movement tours or scanning parameters to maximize coverage of the longest possible perimeter by each image sensor in the group of sensors 110-113. Additionally, the PTZ control module 190 may for instance identify gaps in the overall image sensor coverage, and ensure accurate target tracking, despite speed/direction changes, handoffs, and other conditions among various image sensors in the group of sensors 110-113. Further, the PTZ control module may control a sensor in response to a rule activation, such as panning to track an object that has crossed a trip wire.

In some embodiments, the collective video data and metadata 115-117 can be transformed and stored in the geo-registered rule and sensor database 130 in a geo-registered map space data format. For example, that data can be encoded or stored in a (latitude, longitude, elevation) format, where each pixel and/or larger portion of a frame or image is assigned at least those three coordinates or values, which locate the pixel relative to the surface of the earth. In various embodiments, a (latitude, longitude) format using only these two absolute coordinates can be used, and such embodiments may be particularly useful where the monitored site or location is relatively flat.

In various embodiments, the geo-registered rule and sensor database 130 can use a geo-registered map space or coordinate system that is a latitude and longitude space corrected or made more accurate by using a geodetic coordinate system. When used, a geodetic coordinate system can be based on a reference ellipsoid that is a mathematically defined surface that approximates the geoid, the truer or more accurate figure of the Earth. Because of their relative simplicity, reference ellipsoids can be used as a preferred surface on which geodetic network computations by geo-calibration module 180 and/or other logic can be performed, and point coordinates such as latitude, longitude, and elevation can be uniformly recorded, encoded, or defined.

The example depicted in FIG. 1 is merely for the purpose of illustration and is not intended to be limiting. Further, the depicted system 100 is an example that has been simplified for clarity of explanation of certain novel and innovative features consistent with certain disclosed embodiments, but this example is not intended to be limiting and many variations are possible. For instance, in various embodiments, the system 100 may include additional sensors and map-based user interface devices, including additional mobile devices.

Figure 2:
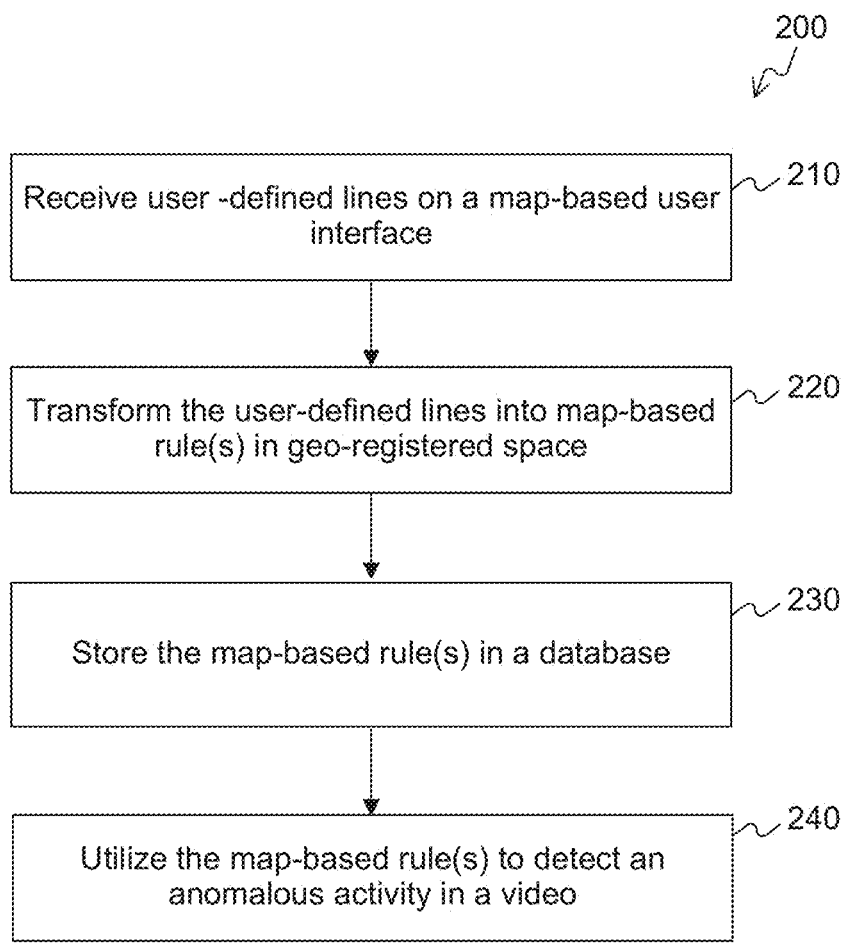
FIG. 2 is a flow chart showing an example of a process for creating video analysis rules that are based on map data, consistent with an embodiment of the invention.

FIG. 2 is a flow chart showing an example of a process 200 for creating video analysis rules that are based on map data, consistent with embodiments of the invention. In various implementations, the process 200 may be performed by the video processing engine 120, which may control the map-based user interface 140; may be performed by an intelligent map-based user interface 140 operating as a peer or client of the video processing engine 120; and/or may be performed by other associated logic and hardware.

In 210, user-defined line(s) can be received on a map, such as is provided by the map-based user interface 140 of FIG. 1. The lines may define a boundary or boundaries, including boundaries that enclose an area, for which the user desires an action to be taken if the boundary is crossed.

Figure 3:
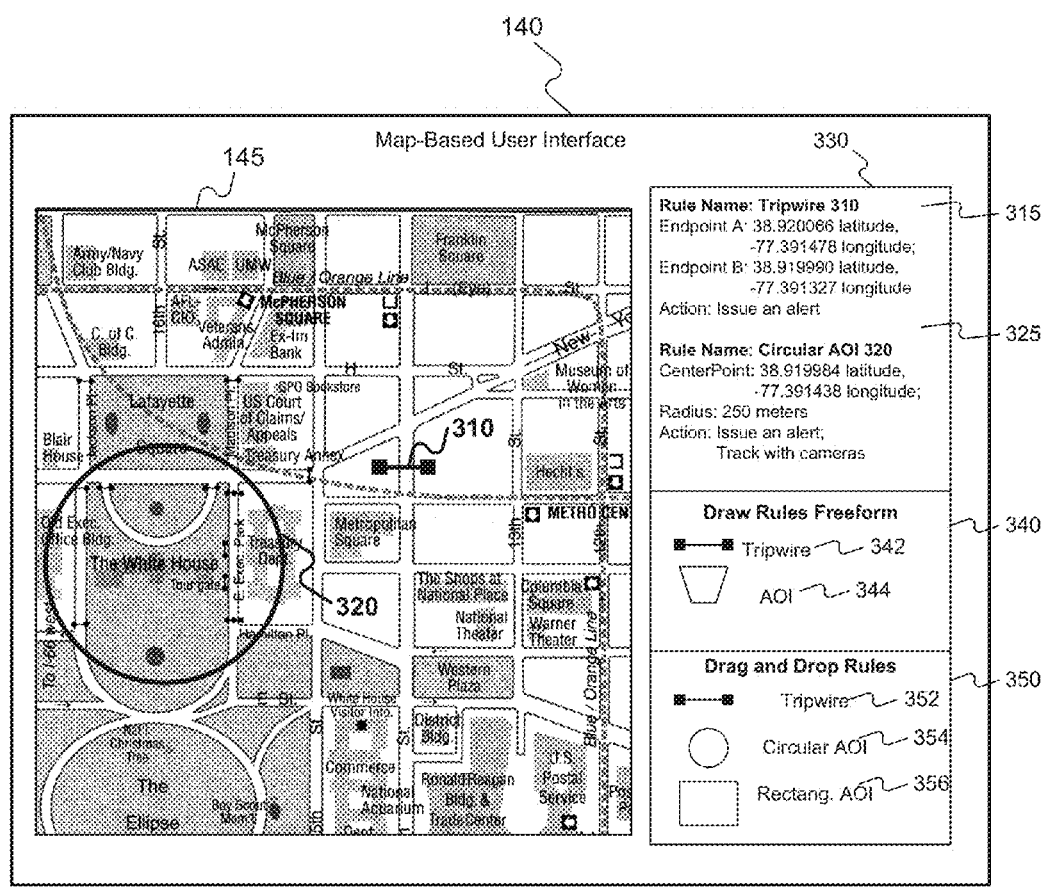
FIG. 3 depicts an example of a user interface of a system for creating video analysis rules that are based on map data, consistent with an embodiment of the invention.

In the embodiment shown in FIG. 1, for example, a computer monitor can present to the user 160 a map view 145 or other visual depiction of the locale, place, or geographic area that is monitored by system 100. In various implementations, the map view 145 may be an overhead or aerial view of an area, such as a satellite or high altitude aerial photo, or a drawn map image as shown in FIG. 3, or a satellite photo overlaid with drawn map features, such as street names, or similar to, for example, the overhead map images presented by Google™ maps or Mapquest.com™.

Using the map view 145 presented by the map-based user interface 140, the user 160 can draw a tripwire, an area of interest (AOI), or the like, on the displayed map using, for example, a finger-operable touchscreen of the computer monitor or mouse-controlled drawing tools, such as a pen or brush or drag-and-drop shapes provided by the user interface 140.

In certain embodiments, a tripwire can consist of a straight line drawn on the map view 145, for instance to mark a segment or boundary for which the system 100 generates an action, such as an anomalous event notification, when crossed by an object. In embodiments, the tripwire can consist of markings or inputs other than a straight line, such as a line with multiple, connected, straight segments, a curved line, or the like. Instead of or in addition to a tripwire, a user may also define an area of interest (AOI) on the map view 145 by drawing or otherwise defining a circle or other closed shape which includes a boundary or perimeter that surrounds or encloses a geographical area, location, site, installation, or the like that is displayed by the map view 145. The AOI can be enclosed within the surrounding boundary or perimeter to identify an area into which the entry or incursion of an object is detected by the system 100 and an action is taken in response, such as classifying the incursion as an anomalous or triggering event, and sending personnel to investigate in real time.

In 220, the process 200 transforms the user-defined lines into a set of map-based rules 175. The map-based rules may be defined in a geo-registered space, and may, as explained above, include location coordinates defining the tripwire or the AOI, such as the latitude and longitude (and/or other coordinates such as elevation) of the endpoints of a straight-line-segment tripwire, where the system 100 identifies or determines the parameters for the rule according to the location coordinates of the endpoints of the tripwire that the user 160 created on the map view 145. As is known in the art, each pixel or small group of pixels in an overhead map view may be labelled with, or have stored for it, or be otherwise associated with location coordinates for a geo-registered space, such as a latitude coordinate and a longitude coordinate, or the like. Thus, when a user 160 selects or otherwise specifies a pixel or group of pixels as, for example, the endpoint of a tripwire or of a segment of a polygon AOI, the map-based user interface 140 may look up or otherwise access the location coordinates corresponding to the user-specified pixel, and incorporate those location coordinates into the new rule. The map-based rules may also include a logic statement(s) that specify the condition(s) that trigger or activate the rule, and a resulting action. One example of such a logic statement is an IF THEN statement.

For instance, referring for a moment to FIG. 3, if the user 160 draws a tripwire line 310 across a road on the map view 145, the video processing engine 120 or the map-based UI 140 may determine the two endpoints of the line, look up the latitude and longitude coordinates of the pixel in each endpoint from the predetermined map data for the map or satellite photo that is displayed on the map view 145 and record the latitude and longitude coordinates, for example represented in a decimal degrees format, such as (38.920066 degrees latitude, −77.391478 degrees longitude) for the first endpoint, and (38.919990 degrees latitude, −77.391327 degrees longitude) for the second endpoint. Because the user 160 has specified a tripwire using the map-based user interface 140, the video processing engine 120 or the map-based UI 140 may then formulate or otherwise create a corresponding geo-registered-space tripwire rule that incorporates the latitude and longitude of the user-drawn tripwire, such as, for example, a rule that states "IF an object passes between (38.920066 degrees latitude, −77.391478 degrees longitude) and (38.919990 degrees latitude, −77.391327 degrees longitude) THEN issue an alert."

Referring again to FIG. 2, at 230, the resulting map-based rule(s) may be stored in a database. For example, a resulting set of rules 175 can be stored to the geo-registered rule and sensor database 130 shown in FIG. 1. In various embodiments, the resulting map-based rule(s) and/or other information may be stored to a database or other data structure implemented in a local or remote storage facility or service, such as a cloud-based storage service, which is accessible to the video processing engine 120.

In 240, the map-based rule(s) may be utilized to detect, identify, and/or react to a rule-triggering activity (e.g., anomalous activity) that is viewed or detected by a sensor(s) that covers the terrain where the rule is located. For example, the set of map-based rules 175 in the geo-registered rule and sensor database 130 and/or other data can be utilized by the video processing engine 120 to detect, identify, and/or react to rule-triggering activity that is viewed or detected by sensors the sensors 110-113, which cover the terrain depicted in the map view 145.

For a more specific example using the example of a rule defined above, a sensor 110 that has a view of (38.920066 degrees latitude, −77.391478 degrees longitude) and (38.919990 degrees latitude, −77.391327 degrees longitude) may send a video stream 115 showing a car traveling over a section of road between those coordinates. The video processing engine 120 may receive the video stream 115 and calculate geo-registered map space coordinates (e.g., latitude and longitude) corresponding to the terrain and objects (e.g., for each pixel or group of pixels) shown in the frames or images of the video stream 115. The video processing engine 120 may then utilize the set of map-based rules 175 to determine whether a rule triggering event has occurred, and if so, to implement an event notification 151 and/or other response by the system 100. In some embodiments, as noted herein, the response may include the adjustment or control of a sensor 110-113 using PTZ control module 190 and/or other logic to change the sensor's FOV, focus in a different area, or make other updates or adjustments, such as a panning or movement of sensors to provide additional surveillance coverage of the tripwire or AOI.

After 240, the process 200 may repeat, return to a prior processing point, jump to a further or other processing point (not shown), or end.

The process 200 depicted in FIG. 2 is an example for the purpose of illustration and is not intended to be limiting. Further, the depicted process 200 is an example that has been simplified for clarity of explanation of certain novel and innovative features consistent with certain disclosed embodiments, but many variations are possible. For example, while the functions and operations are shown as being performed in a particular order, the order described is merely an example, and various different sequences of operations can be performed, consistent with certain disclosed embodiments. Moreover, the operations are described as discrete steps merely for the purpose of explanation, and, in some embodiments, multiple operations may be performed simultaneously and/or as part of a single computation or larger operation. The operations described are not intended to be exhaustive, limiting, or absolute, and various operations can be modified, inserted, or removed.

FIG. 3 depicts an example of a user interface 140 of a system for creating video analysis rules that are based on map data and accompanying video analytic operations consistent with embodiments of the invention. In the embodiment shown, the map-based user interface 140 may include a scrollable map view 145 presented to a user 160 on a display, such as a computer touch-screen display. As noted above, the above, the map or overhead photo shown in the map view 145 preferable depicts an area that is covered by the sensors of the system 100, such as the sensors 110-113.

The map view 145 may be configured to receive and show rule-representing lines, icons, or features inputted by the user, for example via the touchscreen, such as a tripwire 310 and an AOI 320. As illustratively shown, the tripwire 310 can be or include a line that is drawn or otherwise input by the user 160, such as the illustrated line 310 across the road shown on the map view 145. Also as illustratively shown, the AOI 320 can be or include a perimeter or boundary line or shape that is drawn or otherwise input by the user 160 so that it encloses or encircles an area shown on the map view 145, such as the illustrated circular AOI 320 enclosing the building and grounds shown on the map view 145.

In the example shown, the user interface 140 includes user-selectable controls, inputs, gadgets, or other elements 340-356 that allow the user 160 to set, create, configure, update, and/or otherwise operate the system 100, including elements that allow the user 160 to define or specify rules on or using the map view 145, such that the rules are specified in terms of geo-registered map space. For instance, the Draw Rules Freeform tool area 340 provides a freeform tripwire control 342 and a freeform AOI control 344, while the Drag and Drop Rules tool area 350 provides a drag-and-drop tripwire element 352, a drag-and-drop circular AOI element 354, and a drag-and-drop rectangular AOI element 356; all of which a user can employ to define one or more map-based rules on the map view 145.

The user 160 can use the freeform tripwire control 342 to draw a tripwire on the map view 145, which the system 100 processes into a tripwire rule defined in the geo-registered map space. For example, the user 160 may finger tap or mouse click on the freeform tripwire control 342 to activate its functionality and then use their finger to draw a tripwire, such as the tripwire 310, on the touchscreen portion displaying the map view 145. Similarly, the user 160 can use the freeform AOI control 342 to draw an AOI on the map view 145, which the system 100 records as an AOI rule defined in the geo-registered map space. For example, the user 160 may finger tap or mouse click on the freeform AOI control 344 and then use their finger to draw an AOI, such as the AOI 320, on the touchscreen portion showing the map view 145.

Similarly, the user 160 can use the drag-and-drop tripwire control 352 to draw or place a tripwire on the map view 145, which the system 100 processes and saves as a tripwire rule defined in the geo-registered map space. For example, the user 160 may right click and hold on the drag-and-drop tripwire control 352 and then use their mouse to drag the tripwire icon into a desired position on the map view 145, such as the tripwire 310. Once positioned on the map view 145, the user 160 may use their mouse to move or reposition the endpoints of the tripwire 310 or to change its position or orientation, to elongate it, to shorten it, etc.

Similarly, the user 160 can use the drag-and-drop circular AOI control 354 to draw or place a circle-shaped AOI on the map view 145, which the system 100 processes and stores into an AOI rule defined in geo-registered map space. For example, the user 160 may right click and hold on the drag-and-drop circular AOI control 352 and then use their mouse to drag the circular AOI into a desired position on the map view 145, such as the AOI 320. Once positioned on the map view 145, the user 160 may use their mouse to change the size of the circular AOI 310 or to change its position or orientation, or to elongate to shorten it on one or more axes to form an elliptical AOI, etc. Also similarly, the user 160 can use the drag-and-drop rectangular AOI control 356 to draw or place a rectangle-shaped AOI on the map view 145, which the system 100 converts and stores as an AOI rule defined in the geo-registered map space. For example, the user 160 may right click and hold on the drag-and-drop rectangular AOI control 356 and then use their mouse to drag the rectangular AOI (not shown) into a desired position on the map view 145. Once placed the map view 145, the user may reposition or resize the rectangular AOI as desired using standard mouse controls or a touchscreen.

As illustratively shown, the user 160 can be presented with a dialogue box at the top of a rules area 330 of the map-based user interface 140, which displays the map-based rules that are currently defined on the map view 145 and/or in the system 100. As previously noted, the system 100 may store the map-based rules defined using the map-based user interface 140 as a set of rules 175 in the geo-registered rules and sensor database 130. In this example, the dialogue box as shown displays the map-based rule 315 for the tripwire 310 shown on the map view 145, the map-based rule 325 for the AOI 320 shown on the map view 145. In various embodiments, the dialogue box may also display the map-based rules for features at locations that are outside of the geographic area of (i.e., not shown on) the map view 145.

As noted previously, in various implementations, the system 100 (e.g., the map-based user interface 140) may analyze the map location of the tripwire 310 as displayed on the map view 145 and create a corresponding rule that is expressed or defined in the geo-registered map space used by the system 100, for example by specifying the rule for the tripwire 310 in terms of latitude, longitude, and/or other coordinates, along with other information. Thus, the dialogue box 330 can for instance describe or recount the geo-registered location of the tripwire 310, for example by describing the tripwire endpoints in latitude, longitude, and/or other coordinates, along with other information, such as with a rule that states "IF an object passes between (38.920066 degrees latitude, −77.391478 degrees longitude) and (38.919990 degrees latitude, −77.391327 degrees longitude) THEN issue an alert," as was previously described with regard to FIG. 2.

In embodiments, the map-based user interface 140 can make or accept modifications or adjustments to the set of rules 175 entered, stored, and/or displayed by the user interface 140, for example, either by textual modification of a rule displayed in the dialogue box 330 or by graphical modification of the icon representing a rule on the map view 145 (e.g., when the user repositions or changes a tripwire 310 or an AOI 320). The user interface 140 can similarly accept new tripwires, AOIs, and/or other features, and receive or generate further rules associated with those features. The user interface 140, in embodiments, can likewise process adjustments to the area displayed by the map view 145 itself, such as zooming and scrolling to adjust the overall area monitored and/or depicted in the map view 145, and any information, geographical feature, or object shown in the map view 145. In general, according to various embodiments, the map-based user interface 140 can be utilized to allow a user to set up, configure, and/or modify the set of rules 175, displayed map view 145, and/or other controls used by the system 100 to perform video analytic operations.

The example depicted in FIG. 3 is merely for the purpose of illustration and is not intended to be limiting. Further, the depicted map-based user interface 140 is an example that has been simplified for clarity of explanation of certain novel and innovative features consistent with certain disclosed embodiments, but this example is not intended to be limiting and many variations are possible. For example, in various embodiments, the map-based user interface 140 may be rearranged to include additional controls, displays or information, or to use multiple tabs or pages to better fit one at a time on the smaller display of a mobile device.

Figure 4:
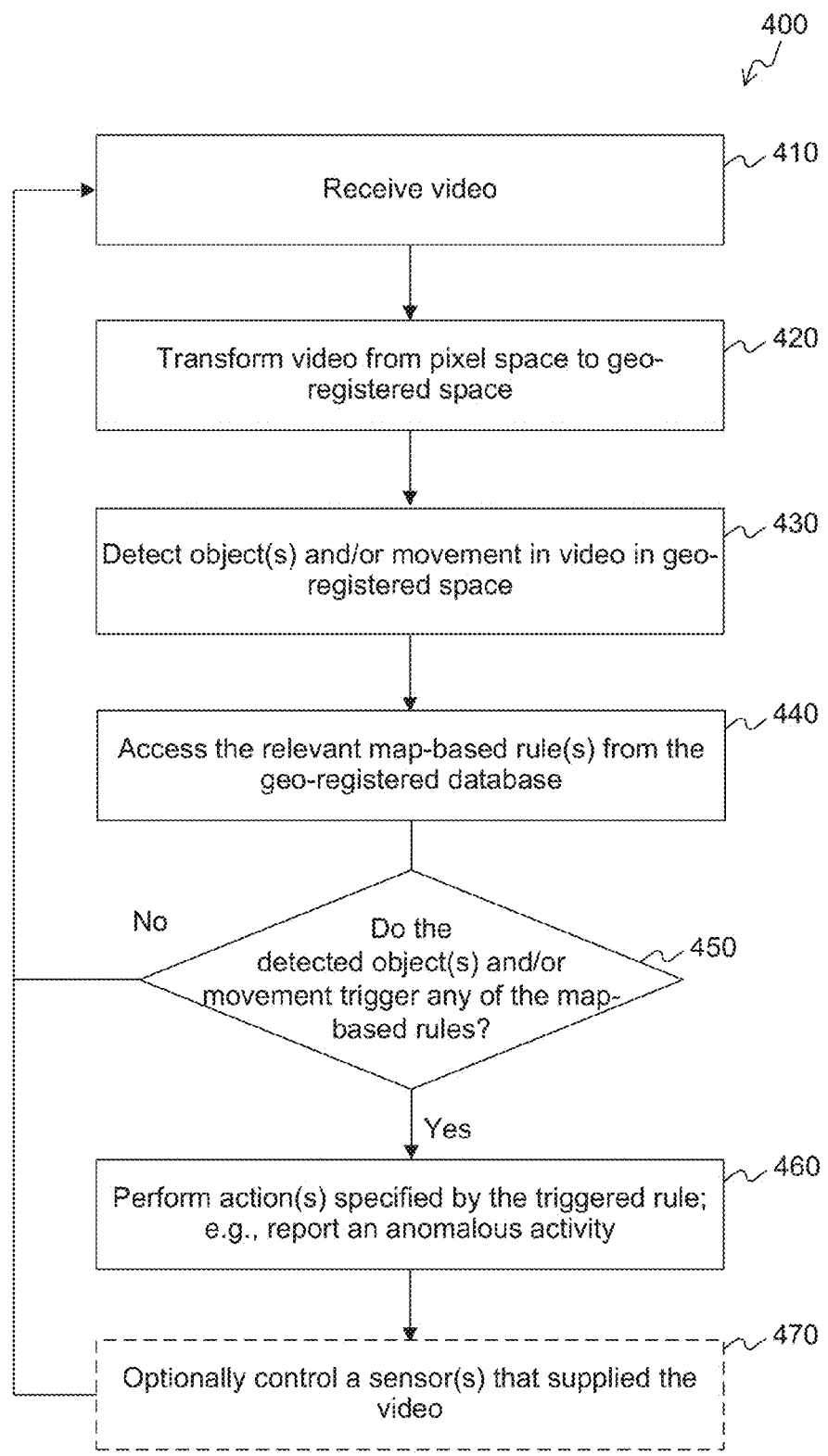
FIG. 4 is a flow chart showing an example of a process for detecting an anomalous activity using video analysis rules that are based on map data, consistent with an embodiment of the invention.

FIG. 4 is a flow chart showing an example of a process 400 for detecting an anomalous activity using video analysis rules that are based on map data, consistent with embodiments of the invention. In various implementations, the process 400 may be performed by the video processing engine 120, the geo-calibration module 180 of the video processing engine 120, and/or by other associated logic and hardware.

In 410, the process 400 starts with receiving video or video information, such as, for example, the video and metadata 115-117 of FIG. 1, which is received by the video processing engine 120 and/or associated logic from one or more video-streaming sensors 110-113.

At 420, the process 400 transforms the video information from pixel space to geo-registered space, such as by associating, labeling, or otherwise describing each pixel in a frame, group of pixels in a frame, area of a frame, frame, and/or image, or the like, of the video with geo-registered map space coordinates (e.g., latitude-longitude coordinates) corresponding to the location of the geographic area, etc. depicted in the video information. In various embodiments, devices, processes, and operations such as those described with respect to FIG. 5, below, may be used to implement 420.

In 430, the process 400 may identify, recognize, locate, classify, and/or otherwise detect one or more objects and/or movements in the video, and may associate, label, or otherwise describe the location of the objects and/or movements in terms of the geo-registered space. For example, a car shown in a video feed from the EO camera 110 may be tagged or described as entering the camera's view from (38.919984 latitude, −77.391438 longitude) and moving through successive locations to (38.920058 latitude, −77.391377 longitude) over successive frames. In some embodiments, devices, processes, and operations for detecting and identifying objects and movement in video images that are known in the art may be used or adapted to implement 430.

At 440, the process 400 may access or retrieve one or more relevant map-based rule(s) from a database or the like, such as a set of rules 175 containing geo-registered map space coordinates that correspond to the geo-registered map space coordinates covered or encompassed by the video information as determined at 420. For example, the process 400 may retrieve the example of a rule described with respect to FIGS. 2 and 3, which is a map-generated tripwire rule that states "IF an object passes between (38.920066 degrees latitude, −77.391478 degrees longitude) and (38.919990 degrees latitude, −77.391327 degrees longitude) THEN issue an alert," where the process deems this rule as relevant because it contains geo-registered map space coordinates (i.e., latitude and longitude values in this example) that are in the vicinity of the car detected at 430.

In 450, a determination may be made whether the detected object(s) and/or movement(s) trigger, activate, or otherwise implicate any of the map-based rule(s) contained in the set of rules 175. Continuing our example, the video processing engine 120 may compare or analyze the car's movement path in successive frames from (38.919984 latitude, −77.391438 longitude) to (38.920058 latitude, −77.391377 longitude) to determine whether it meets the rules condition: "IF an object passes between (38.920066 degrees latitude, −77.391478 degrees longitude) and (38.919990 degrees latitude, −77.391327 degrees longitude)," which would trigger or activate the rule.

If the determination in 450 is that none of the set of rules 175 has been triggered (450, No), then processing returns to 410 to further monitor and analyze additional video information.

If, on the other hand, 450 determines that the detected object(s) and/or movement has triggered a map-based rule (450, Yes), then processing proceeds to 460. At 460, the process 440 may perform an action(s) specified by the triggered ruled, such as issuing an alert to report the anomalous activity event to a user, such as the user 160. Continuing the previous example, the video processing engine 120 and/or associated logic determines that the car traveling from (38.919984 latitude, −77.391438 longitude) to (38.920058 latitude, −77.391377 longitude) does indeed cross the tripwire previously defined on the map view 145 from (38.920066 latitude, −77.391478 longitude) to (38.919990 latitude, −77.391327 longitude), and issues an alert regarding the rule-triggering activity in accordance with the "THEN" portion of the rule.

For example, the video processing engine 120 and/or associated logic can transmit or communicate an alert or event notification 151 indicating that an anomalous activity event has been triggered or detected. The event notification 151 can be or include a text message or visual icon or alert transmitted to the mobile device 150 with information describing the event (e.g., that a car crossed a tripwire, and the location), but could also be or include other forms or types of data or notification, such as data that activates an application installed the mobile device 150, which may retrieve and or display information about the event.

Following 460, or in some implementations instead of 460, at 470 the process 400 may optionally control the sensor(s) (e.g., camera or a camera-equipped vehicle) that supplied the video information. For example, in response to triggered rule, the PTZ control module 190 of the video processing engine 120 may cause a sensor 110-113 to track an object that breached the tripwire 310 or entering the AOI 320. Moreover, in various embodiments, the rules may specify, and the video processing engine 120 may perform, many other actions in addition or alternatively to generating alerts and controlling sensors, such as activating gates, activating lights, autodialing police, etc.

After 470, the process 400 may repeat as shown. In various implementations, the process 400 may also or alternatively, jump or return to any other processing points or end.

The process 400 depicted in FIG. 4 is an example for the purpose of illustration and is not intended to be limiting. Further, the depicted process 400 has been simplified for clarity of explanation of certain novel and innovative features consistent with certain disclosed embodiments, but many variations are possible. For example, while the functions and operations are shown as being performed in a particular order, the order described is merely an example, and various different sequences of operations can be performed, consistent with certain disclosed embodiments. Moreover, the operations are described as discrete steps merely for the purpose of explanation, and, in some embodiments, multiple operations may be performed simultaneously and/or as part of a single computation or larger operation. The operations described are not intended to be exhaustive, limiting, or absolute, and various operations can be modified, inserted, or removed. For example, stages or operations 420 and 430 may be modified and reversed in order such that detection of objects and movement is performed in pixel space, and then the video information and the information describing the detected objects and movement may be transformed or labelled from pixel space to geo-registered space. For another example, the determination of 450 may be performed in the pixel domain by converting the map-based relevant rule(s) to the pixel domain and applying the rule(s) to the pixel domain video, which may utilize existing pixel-domain technology. For yet another example, although process 400 and most of the other embodiments described herein process and analyze video, video information and video streams, process 400 the other embodiments may similarly be applied to a still photograph or a series of still photographs taken at short intervals, such as every 0.05 second, every 0.1 second, every 0.2 second, every 0.5 second, or the like.

Figure 5:
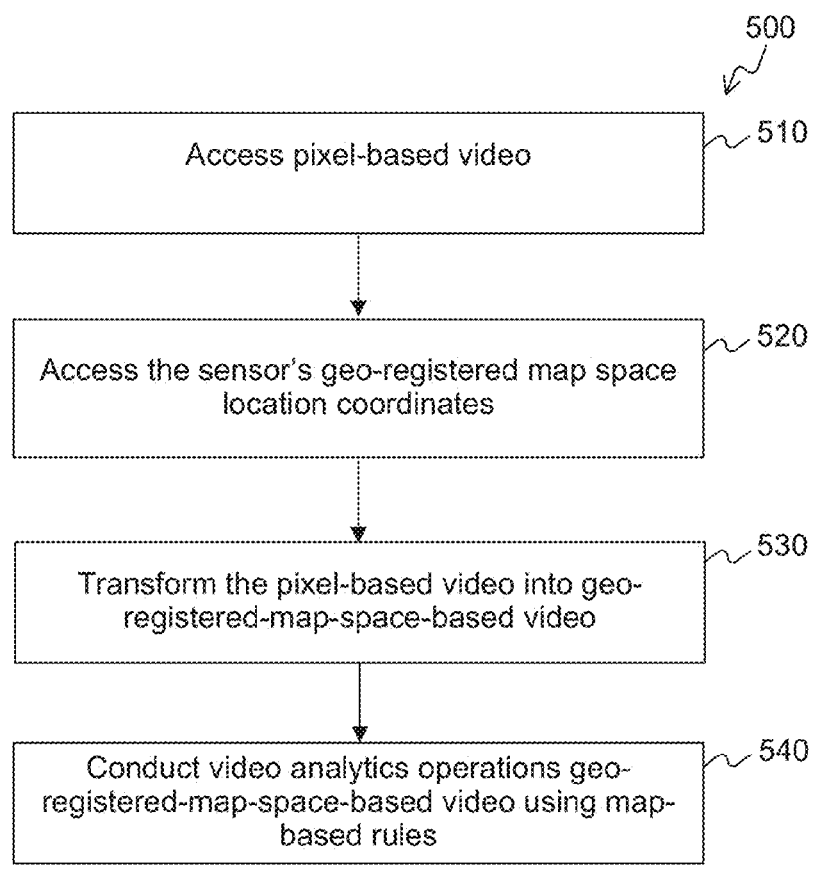
FIG. 5 is a flow chart showing an example of a process for translating pixel-based video data into map-based video data that may be analyzed with map-based video analysis rules, consistent with an embodiment of the invention.

FIG. 5 is a flow chart showing an example of a process 500 for translating pixel-based video data into map-based video data that may be analyzed with map-based video analysis rules, consistent with embodiments of the invention. In various implementations, the process 500 may be performed by the video processing engine 120 and/or by other associated logic and hardware.

At 510, the process 500 may access or receive pixel-based video, e.g., a video stream from a sensor (e.g., a video camera) or a series of still images from a digital camera. The pixel-based video may include metadata describing the video, the sensor, the sensor's location and descriptive parameters, and the like (e.g., the video and metadata 115-117 of FIG. 1). In some embodiments, the video data can be received in real time, using a streaming video format such as MPEG (Motion Pictures Expert Group), JPEG Joint Photographic Experts Group), H.264, and/or the like. In some other embodiments, this operation may include accessing stored pixel-based video data, (including pixel-based video data that is only very briefly stored after being received from a sensor, such that this process is performed in near real-time (e.g., within one second) with respect to the recording time of the video data), from a memory or a database, such as the geo-registered rule and sensor database 130.

In 520, the process 500 may access or receive sensor location coordinates that specify the geo-registered map space location of the sensor that supplied the pixel-based video (e.g., the fixed location of camera 110 or camera 111, or the current dynamic location of the mobile camera 113). In some embodiments, 520 may also include accessing geo-registered map space location coordinates for a terrain feature(s), pixel(s), group(s) of pixels, or the like in the field of view (FOV) of the sensor, which may be stored with or in association with the sensor's coordinates. A terrain feature may be almost anything that is within the field of view of the sensor and that is preferably immovable, such as a tree, a bush, a building or a portion of a building (e.g., a corner or a doorway), a sign, the corner of a street intersection, a light post, a telephone pole, a fire hydrant, a boulder, a portion of a fence, a gate, a marking on the ground, etc.

In various embodiments, the location coordinates of a fixed sensor (e.g., 110, 111) and/or the location coordinates of a terrain feature(s) (which is represented by pixels in the video data) may be determined, capture, configured, or otherwise inputted at the time that the fixed sensor is installed, for example, using a hand-held GPS device to gather or determine the coordinates while co-located with (e.g., standing next to) the sensor and/or while co-located with the terrain feature(s). In such embodiments, the location coordinates of the fixed sensor and/or terrain feature(s) may be recorded or stored in a memory location or storage device that is accessible by the video processing engine 120, such as the geo-registered rule and sensor database 130. For instance, a human installer can capture GPS or other location data while installing a fixed video sensor, such as the EO camera 110, and visiting terrain features in its FOV. The installer may store that location data in the geo-registered rule and sensor database 130, where it is accessible to the video process engine 120 for use to identify or otherwise determine that video sensor's location and the location of the displayed terrain features (e.g., specific pixels or pixel groups) in latitude/longitude or other reference coordinates in the geo-registered map space.

In various embodiments, a sensor may have the ability to determine its own location (e.g., using a built-in GPS device). In such embodiments, the sensor may send its location coordinates to the video processing engine 120, for example in metadata that accompanies video data 115-117. For example, an aerial mobile camera 113 that is equipped with a GPS device may stamp or encode location-coordinate metadata with the video data 117 that it transmits in its video stream. For another example, a fixed sensor, such as the EO camera 110, may either store its location coordinates internally when it is installed, or it may be equipped with a GPS device that determines its location coordinates periodically, and it may transmit those location coordinates as metadata with its video information 115.

At 530, the process 500 may translate or transform the pixel-based video (from 510) into map-based video that is associated with location coordinates in the geo-registered map space used by the system 100. In various embodiments, the process 500 may create, calculate, assign, extrapolate, or otherwise determine location coordinate(s) for each pixel, group of pixels, frame, image, or the like in the pixel-based video data, such that the video data is characterized or described in the same geo-registered map space as the map-based rules described herein, such as the set of rules 175.

In various embodiments, stage 530 may utilize various techniques to calculate and assign location coordinates to each element (e.g., each pixel or group of pixels) in a video frame or still image and/or calculate and assign location coordinates to an object in the video frame or still image, and thus create the geo-registered-map-space-based video.

Figure 6:
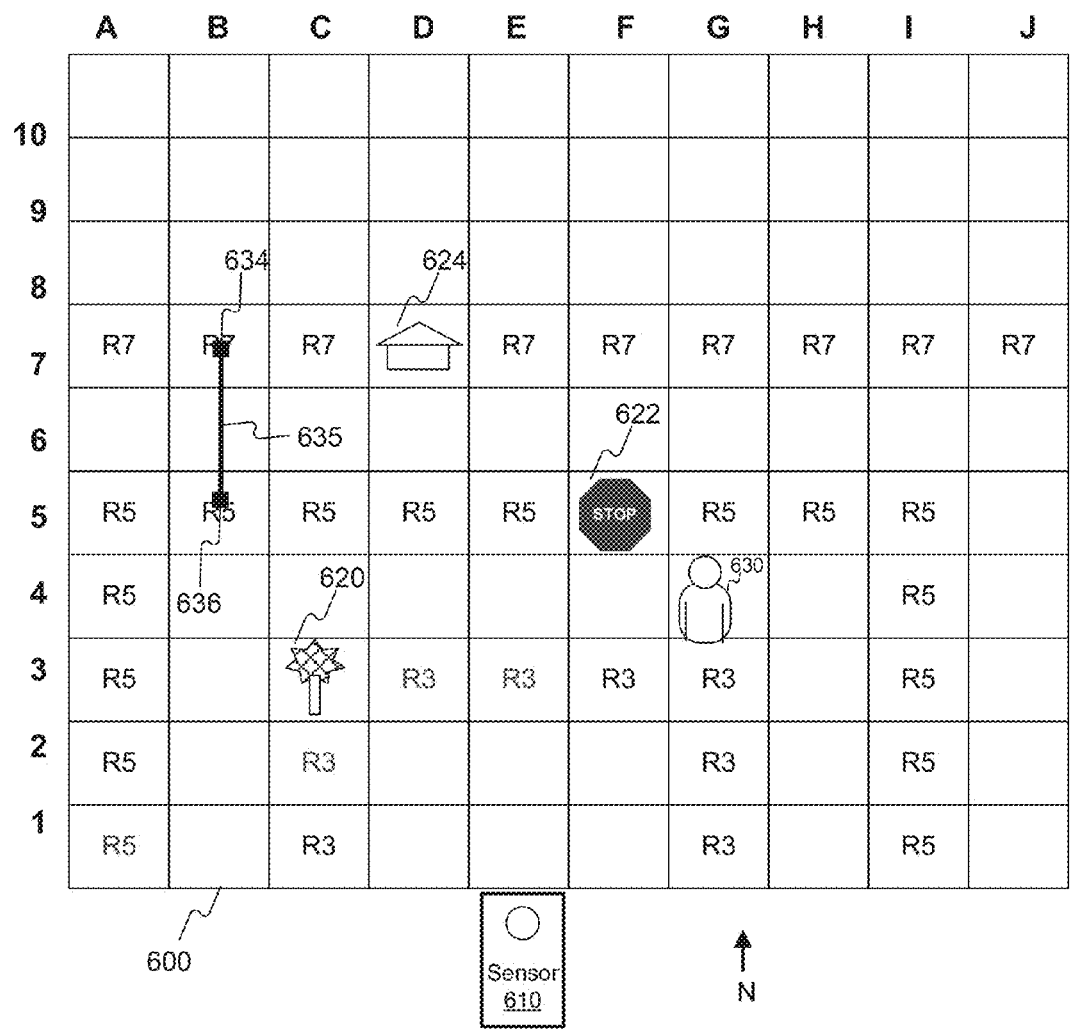
FIG. 6 shows an example of a pixel-based video frame that is converted to a map-coordinate-based frame using terrain features having predetermined map location coordinates.

For example, consider FIG. 6, which shows an example of a video frame 600 captured by a sensor 610, such as an electro-optical video camera 110, a thermal camera 111, or a mobile camera 113. In this example, the video frame 600 consists of ten rows 1-10 and ten columns A-J of elements. For ease of explanation, this example will describe the 100 cells (i.e., the shown 10×10 array having rows 1-10 and columns A-J) making up the frame 600 as "elements," with the understanding that various embodiments may divide and process the frame 600 such that each element corresponds to a single pixel or a group of pixels. For example, in various different embodiments, each element at the intersection of a row and column may consist of a group of pixels, such as a group of 4 pixels (each element is a 2×2 array), 16 pixels (each element is a 4×4 array), 64 pixels (8×8 array), 256 pixels (16×16 array), etc., and the like.

In various implementations, given the known location of the sensor 610 (e.g., the location predetermined at installation or transmitted by the sensor with the video as metadata with the frame 600) and/or other sensor data (e.g., which may be assumed or estimated, predetermined at installation, or transmitted by the sensor with the video) such as the sensor's height above the ground (e.g., 6 feet off the ground, 25 feet off the ground, etc.), pan angle (e.g., pointing straight North, pointing 45 degrees North-West, etc.), and tilt angle (e.g., zero degrees tilt, −5 degrees from horizontal, etc.), the system 100 can estimate or extrapolate the distance of all of the elements in the frame 600 relative to the sensor 610 using standard trigonometric and geometric calculations and/or models (e.g., the Pythagorean theorem).

In some embodiments, the sensor 610 may have the capability to determine the range (i.e., distance) to an object or terrain feature depicted in an element(s) of the frame 600, for example, using a built-in rangefinder in the sensor 610, such as a laser rangefinder, and may transmit the range information as metadata with the frame 600. In some embodiments, the sensor 610 may be capable of generating and transmitting its current location data in geo-registered space coordinates (such as latitude, longitude), or other fixed or reference coordinates. In such embodiments, the system 100 (e.g., the video processing engine 120 and/or associated logic) may access and/or receive a set of geo-registered map data from the sensor 610, which encodes map position information into its native transmitted video data, for example as metadata with the video stream 115-117.

In some embodiments, given optical information describing the sensor 610, such as the focal length of the lens, (including the focal length used to capture the frame 600 if the lens has variable zoom), the system 100 may also or alternatively employ standard optics calculations and/or models to estimate or extrapolate the distance to at least one element and then estimate or extrapolate the distance to all of the other elements. For example, if the size (or an approximate size) of an object in the frame 600 is known (e.g., the size of the stop sign 622 in FIG. 6 is, or is estimated to be, 2.4 meters tall), then the system 100 may use optics Equation 1 or the like to estimate the distance from the sensor 610 to the element depicting the object (e.g. element 5F in the frame 600, which shows a stop sign and is labelled 622).

$$\text{distance to object (mm)} = \frac{\text{focal length (mm)} \times \text{height of object (mm)} \times \text{image height (pixels)}}{\text{Object height (pixels)} \times \text{sensor height (mm)}} \quad \text{Eq. 1}$$

In still other embodiments, given the predetermined location of one or more terrain features depicted in an element(s) of the frame 600, such as the three terrain features 620-624, the system 100 can estimate or extrapolate the locations of all of the other elements in the frame 600 relative to the sensor 610 using the predetermined locations and standard geometric and trigonometric calculations and techniques and/or models.

For example as shown in FIG. 6, the frame 600 depicts terrain features having predetermined location coordinates (620-624) and objects and elements (630-636) that have location coordinates that are unknown until calculated by the system 100. In this example, the frame 600 depicts or displays the images of three terrain features that have predetermined location coordinates (e.g., each may have had its latitude and longitude GPS-determined and stored in the system 100 when the sensor 610 was installed): a tree in the element 620 at the intersection of row 3, column C (a.k.a. element 3C); a stop sign in the element 622 at the intersection of row 5, column F (5F); and a house in the element 624 at 7D.

As shown, the sensor 610 having known, predetermined location coordinates may capture and stream or otherwise supply the video frame 600. Given the location coordinates of the sensor 610 (e.g., latitude and longitude) and the location coordinates of the tree (e.g., latitude and longitude) depicted in element 620 (element 3C of the frame 600), various embodiments of the system 100 may calculate or determine the distance from the sensor 610 to the element 620 (3C) using standard geometric and trigonometric calculations and techniques, such as the Haversine formula.

After calculating the distance to a known-location element, such as the element 620, such embodiments of the system 100 may then estimate or extrapolate the distance to other elements in the frame 600 based on the calculated distance to the known-location element. After assigning an estimated/extrapolated distance from the known location of the sensor 610 to the other elements, the system 100 may then calculate or determine the location coordinates for each of those other elements using standard geometric and trigonometric calculations and techniques, such as the Haversine formula.

For example, if the system 100 calculates the distance to a known-location element 620 (the tree) as being 100 meters, then the system 100 may estimate or extrapolate that each element in the frame 600 that is the same number of elements away from the sensor 610 is also 100 meters in distance. In other words, each element that falls on the same radius, expressed in frame elements, as the reference element having a known location (i.e., element 620) is estimated as being the same distance away from the sensor 610 as the reference element. Thus, in such an implementation, the system 100 may estimate that all of the elements labelled "R3" (radius of 3 elements from the sensor 610) in FIG. 6 (i.e., elements 1C, 2C, 3D, 3E, 3F, 3G, 2G, and 1G) are 100 meters from the sensor 610, as this was the distance calculated for the reference element 620 (the tree). As noted above, once a distance from the known-location sensor 610 is estimated or assigned to an element, the system can calculate or determine the geo-registered map space location coordinates for that element using standard geometric and trigonometric calculations and techniques, such as the Haversine formula.

Continuing the above example, based on the known location of the element 622 containing the stop sign, the system may estimate, extrapolate, or otherwise determine the distance from the sensor 610, and then the location coordinates, of the elements labelled "R5" in FIG. 6; and based on the known location of the element 624 containing the house, the system may estimate, extrapolate, or otherwise determine the locations of the elements labelled "R7" in FIG. 6.

Further continuing the above example, based on the estimated/extrapolated locations of the elements labelled R3 and the elements labelled R5, the system may estimate, extrapolate, or otherwise determine the locations of the elements between R3 and R5; i.e., elements 1B, 2B, 3B, 4B, 4C, 4D, 4E, 4F, 4G, 4H, 3H, 2H, and 1H. For instance, if the R3 elements are determined to be 100 meters from the sensor 610, and the R5 elements are determined to be 500 meters from the sensor 610, then the system 100 may estimate that the in-between elements 1B, 2B, 3B, 4B, 4C, 4D, 4E, 4F, 4G, 4H, 3H, 2H, and 1H are each 300 meters from the sensor 610, using an averaging formula: (100 m+500 m)/2.

Regardless of the exact calculations and techniques used in various implementations, embodiments consistent with this disclosure produce a geo-registered map space coordinates, such as a latitude-longitude coordinates, for some or all of the elements in the frame 600. Moreover, the system may assign or associate an element's coordinates with an object(s) (e.g. a movable object) that is depicted by or occupies that element in the frame 600. For example, the system 100 may assign or associate the location coordinates of the element 4G to the person 630 (e.g. a movable object) who was in the terrain of element 4G when frame 600 was captured.

In addition, the system 100 may analyze, process and/or display rules that are defined in terms of the same geo-registered map space location coordinates as the elements in the frame 600, to determine whether and when the rules are triggered or activated. For example, the system 100 may process a tripwire rule containing location coordinates that fall within the geographic area shown in the frame 600. The system 100 may display a tripwire rule having endpoints 634 and 636 in the elements 5B, 6B, and 7B based on the location coordinates of the endpoints 634 and 636, (which are stored as part of the rule) matching, falling within, or otherwise corresponding to the location coordinates of the elements 5B, 6B, and 7B, which are calculated, estimated, or otherwise assigned when the frame 600 is processed. And, the system may determine or recognize that when and if an object, such as person 630, enters or passes through elements 5B, 6B, or 7B (e.g., in successive frames), then the tripwire rule is activated or triggered.

As noted above with respect to various possible implementations, the calculated estimates or extrapolations of the locations of the elements in the frame 600 and/or their distances from the sensor 610 may be based on one or more assumptions when actual measurements or data is not available, such as an assumption as to the height or elevation of the sensor 610, an assumption regarding the sensor 600's pan angle, and/or an assumption describing the characteristics or topography of the terrain depicted in the frame 600 (e.g., that the terrain is level, that the terrain slopes 6 degrees uphill moving away from the sensor 610, etc.). The more accurate these assumptions are, the more accurate the calculated estimate or extrapolation will be.

As noted above for various possible implementations, once the distance from the known geo-registered map space location of the sensor 610 to an element is calculated, the system 100 can then calculate the element's location coordinates in geo-registered map space using standard geometric and trigonometric calculations and techniques, such as the Haversine formula. In various implementations, the system 100 calculates and expresses the locations of the elements in the frame 600 in terms of the same geo-registered map space (e.g., in terms of latitude and longitude), used to describe the location of the sensor 610 and used to define the map-based rules in the geo-registered rule and sensor database 130.

The example depicted in FIG. 6 is merely for the purpose of illustration and is not intended to be limiting. Further, the depicted video frame 600 and associated processing is an example that has been simplified for clarity of explanation of certain novel and innovative features consistent with certain disclosed embodiments, but this example is not intended to be limiting and many variations are possible. For example, although altitude or elevation information may be omitted from calculations of distance and location when topography depicted in the frame 600 is a flat or relatively flat area, in other implementations altitude or elevation information (either as an assumption or using measured data) can be employed in the calculations of distance and location if the sensor 610 is covering hilly terrain or other vertical features. Furthermore, while several examples of techniques and calculations for converting or transforming a pixel-space frame 600 into a geo-registered map space frame 600 are disclosed, one of ordinary skill will appreciate that other techniques, equations, formulas, expressions, and/or calculations can be used to produce geo-registered map space coordinates for the elements and objects in a video frame 600.

Referring back again to FIG. 5, at 540, the process 500 may conduct video analytics operations using the map-space-based video data from 530, (which was created from the pixel-based video and metadata 115-117, 600), and the map-based rules, (such as the set of rules 175 defined by the user 160 using the map-based user interface 140), both of which are expressed or specified in a common geo-registered map space, such as in latitude, longitude coordinates or a like format. It may be noted that, when desired, the video data from sensors and the map-based rules can also be translated back into pixel space or a pixel-based format, and/or other formats or configurations. After 540, processing can repeat, return to a prior processing point, jump to a further or other processing point, or end.

The process 500 depicted in FIG. 5 is an example for the purpose of illustration and is not intended to be limiting. Further, the depicted process 500 has been simplified for clarity of explanation of certain novel and innovative features consistent with certain disclosed embodiments, but many variations are possible. For example, while the functions and operations are shown as being performed in a particular order, the order described is merely an example, and various different sequences of operations can be performed, consistent with certain disclosed embodiments. Moreover, the operations are described as discrete steps merely for the purpose of explanation, and, in some embodiments, multiple operations may be performed simultaneously and/or as part of a single computation or larger operation. The operations described are not intended to be exhaustive, limiting, or absolute, and various operations can be modified, inserted, or removed.

Figure 7:
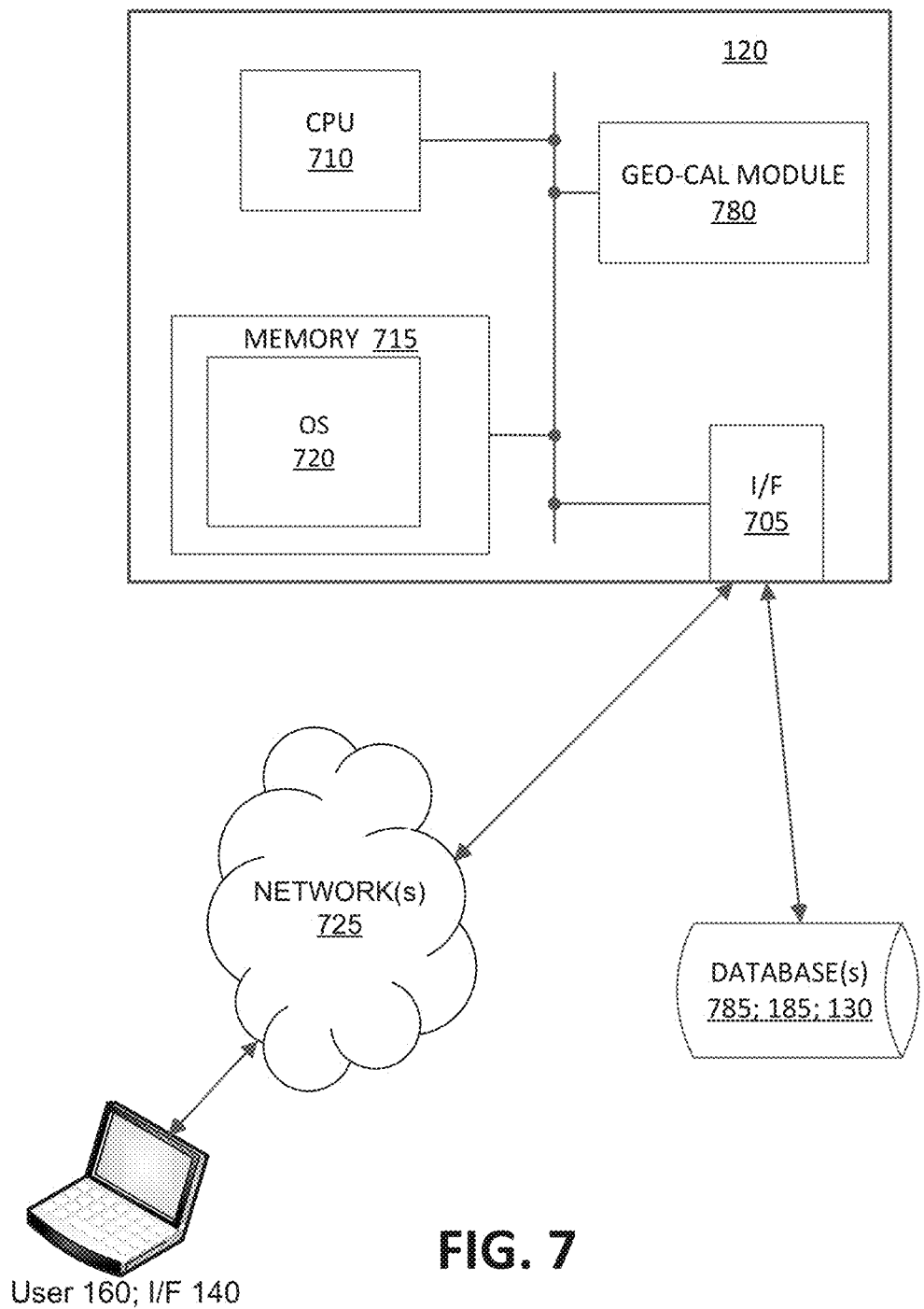
FIG. 7 is a block diagram illustrating an example of a computing system that may be used to implement various embodiments consistent with the invention.

FIG. 7 is a block diagram illustrating an example of a computing system 700 that may be used to implement various embodiments consistent with the invention. As shown in FIG. 7, the video processing engine 120 and/or other components, elements, or logic incorporated in system 100 can be or include various illustrative hardware, software, and other resources, such as a computer or computing system, that can be used in implementations of system 100. In embodiments as shown, the video processing engine 120 can comprise a platform including a processor 710 communicating with a memory 705, such as an electronic random access memory, operating under control of or in conjunction with an operating system 720. The processor 710 in embodiments can be incorporated in one or more servers, clusters, and/or other computers or hardware resources, and/or can be implemented using cloud-based resources. The operating system 720 can be, for example, one of the Microsoft Windows™ family of operating systems, a distribution of the Linux™ operating system, the Unix™ operating system, or other open-source or proprietary operating system or platform. The processor 710 can communicate with a geo-database 785, such as a database, data structure, or data stored on a local or remote hard drive or drive array, to access or store various information including geo-registered map space video data or images, sensor-describing information, which may include the sensor's location in geo-registered map space, and video analytic rules (e.g., tripwire rules, AOI rules, etc.) expressed or defined in geo-registered map space. In some embodiments, the geo-database 785 may implement the geo-registered rule and sensor database 130 described herein. The processor 710 can further communicate with a network interface 705, such as an Ethernet or wireless data connection, which in turn communicates with the one or more networks 725, such as the Internet or other public or private networks. The processor 720 can, in general, be programmed or configured to execute control logic and to control various processing related to video analytic operations described herein, including to generate the set of rules 175, to convert pixel-based video into map-space-based video, and to apply map-based rules to the map-space-based video. Other configurations of the video processing engine 120, associated network connections, and other hardware, software, and service resources are possible.

Although the above discloses examples of methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods and apparatus, persons having ordinary skills in the art will readily appreciate that the examples provided are not the only way to implement such methods and apparatus. For example, the methods may be implemented in one or more pieces of computer hardware, including processors and microprocessors, Application Specific Integrated Circuits (ASICs), and/or other hardware components.

It is contemplated that any part of any aspect or embodiment discussed in this specification can be implemented or combined with any part of any other aspect or embodiment discussed in this specification.

With respect to the methods and processes described herein including, for example, those described in connection with FIGS. 2, 4, 5, and 6, it will be appreciated that in some instances, the component portions of the described processes may be performed in an order other than is described herein. Also, it will be appreciated that not all of the blocks or operations described in the flowcharts are required to be performed, that additional blocks or operations may be added, and that some of the illustrated blocks or operations may be substituted with other blocks or operations.

The present disclosure has described various systems and methods with regard to one or more embodiments. However, it will be apparent to persons skilled in the art that a number of variations and modifications can be made without departing from the teachings of the present disclosure. For example, while the figures and description herein refer to a camera or other video sensor and to the control of the video processing engine 120 separately, in some embodiments the functionality from both described devices may exist in a single system or apparatus. For example, a video source may be a camera system that provides all of the functionality described herein relating to cameras and image collection, as well as the functionality described herein relating to video processing engine 120. In such an embodiment, a camera system may operate as a server with the ability to control and communicate with other camera systems. Other components or resources described as singular can in embodiments be distributed amongst multiple elements, and other components or elements describe as multiple can be combined.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for generating video analysis rules, the system comprising:
   a memory containing instructions;
   an interface to a sensor that provides video of at least a portion of a geographic area;
   a map-based user interface; and
   a processor, operably connected to the memory, the interface to the sensor, and the map-based user interface, that executes the instructions to perform operations comprising:
      displaying, on the map-based user interface, a map of the geographic area that is covered by the sensor;
      accepting, via the map-based user interface, a rule-representing feature that is placed in a specific location on the map by a user;
      generating a video analysis rule based on the rule-representing feature and the specific location on the map, wherein the video analysis rule is expressed in a geo-registered map space;
      applying the video analysis rule to the video from the sensor to detect a triggering event in the video;
      generating a notification upon detection of the triggering event; and
      transmitting the notification to a connected device.

2. The system of claim 1, wherein the notification causes the connected device to perform an action from the group consisting of: emitting a sound; displaying a view of the geographic area that is covered by the sensor; and providing a user-selectable link that activates transfer of information regarding the triggering event from another device.

3. The system of claim 1, wherein the rule-representing feature is a tripwire.

4. The system of claim 1, wherein the rule-representing feature is an area of interest.

5. The system of claim 1, wherein the geo-registered map space is defined in coordinates that are latitude and longitude coordinates.

6. The system of claim 1, wherein the video provided by the sensor comprises pixel-space video.

7. The system of claim 6, further comprising:
   transforming the pixel-space video into video in the geo-registered map space.

8. The system of claim 7, wherein transforming further comprises:
   associating an element from a frame of the video with coordinates in the geo-registered map space.

9. The system of claim 8, wherein the coordinates in the geo-registered map space are latitude and longitude coordinates.

10. The system of claim 8, wherein the video analysis rule is expressed in coordinates in the geo-registered map space; and
    wherein applying the video analysis rule to the video from the sensor comprises:
       comparing the coordinates of the element from the frame of the video with the coordinates of the video analysis rule to detect the triggering event.

11. A method for generating video analysis rules, the method comprising:
    displaying, by a computing device, a map of a geographic area that is covered by a sensor that provides video of at least a portion of the geographic area;
    providing, by the computing device, a user with an interface to place a rule-representing feature in a specific location on the map;
    generating, by the computing device, a video analysis rule based on the rule-representing feature and the specific location on the map, wherein the video analysis rule is expressed in a geo-registered map space;
    applying, by the computing device, the video analysis rule to the video from the sensor to detect a triggering event in the video;
    generating, by the computing device, a notification upon detection of the triggering event; and
    transmitting the notification to a connected device that alerts a user.

12. The method of claim 11, wherein the notification causes the connected device to perform an action from the group consisting of: emitting a sound; displaying a view of the geographic area that is covered by the sensor; and providing a user-selectable link that activates transfer of information regarding the triggering event from another device.

13. The method of claim 11, wherein the rule-representing feature is a tripwire.

14. The method of claim 11, wherein the rule-representing feature is an area of interest.

15. The method of claim 11, wherein the geo-registered map space is defined in coordinates that are latitude and longitude coordinates.

16. The method of claim 11, wherein the video comprises pixel-space video.

17. The method of claim 16, further comprising:
    transforming the pixel-space video into video in the geo-registered map space.

18. The method of claim 17, wherein transforming further comprises:
    associating an element from a frame of the video with coordinates in the geo-registered map space.

19. The method of claim 18, wherein the coordinates in the geo-registered map space are latitude and longitude coordinates.

20. The method of claim 18, wherein the video analysis rule is expressed in coordinates in the geo-registered map space; and
    wherein applying the video analysis rule to the video from the sensor comprises:
comparing the coordinates of the element from the frame of the video with the coordinates of the video analysis rule to detect the triggering event.

\* \* \* \* \*